United States Patent
Thomas et al.

(10) Patent No.: US 7,287,620 B2
(45) Date of Patent: Oct. 30, 2007

(54) METHOD AND APPARATUS FOR CONTROLLING THE SPEED RANGES OF A MACHINE

(75) Inventors: Dante T. Thomas, Garner, NC (US);
Mark A. Sporer, Raleigh, NC (US);
Michael S. Freberg, Raleigh, NC (US);
Paul A. Dvorak, Sanford, NC (US)

(73) Assignee: Caterpillar S.A.R.L., Geneva (CH)

( * ) Notice: Subject to any disclaimer, the term of this patent is extended or adjusted under 35 U.S.C. 154(b) by 221 days.

(21) Appl. No.: 10/889,685

(22) Filed: Jul. 13, 2004

(65) Prior Publication Data

US 2006/0011400 A1    Jan. 19, 2006

(51) Int. Cl.
*B60K 17/00* (2006.01)
(52) U.S. Cl. .................. 180/305; 180/170; 701/93; 74/730.1
(58) Field of Classification Search .............. 180/170, 180/175, 305, 178, 179; 701/93; 74/730.1, 74/496; 60/906, 470
See application file for complete search history.

(56) References Cited

U.S. PATENT DOCUMENTS

| | | | |
|---|---|---|---|
| 4,228,879 A * | 10/1980 | Woodbury | ............... 192/219.4 |
| 4,663,937 A * | 5/1987 | Cullin | ........................ 60/431 |
| 4,801,857 A * | 1/1989 | Bundy | ........................ 318/626 |
| 4,943,756 A * | 7/1990 | Conley et al. | ............... 318/671 |
| 5,343,783 A * | 9/1994 | Tanaka et al. | ............... 477/131 |
| 5,749,804 A * | 5/1998 | Toukura | ....................... 477/47 |
| 5,873,427 A | 2/1999 | Ferguson et al. | |
| 5,913,950 A * | 6/1999 | Matsufuji | ................... 74/730.1 |
| 6,246,940 B1 * | 6/2001 | Ochiai et al. | .................. 701/51 |
| 6,260,647 B1 | 7/2001 | Calamari et al. | |
| 6,405,119 B1 | 6/2002 | Linden | |
| 6,470,771 B2 * | 10/2002 | Nanri et al. | ................ 74/733.1 |
| 6,581,710 B2 | 6/2003 | Sprinkle et al. | |
| 6,789,009 B2 * | 9/2004 | Schmitz et al. | ............... 701/93 |
| 2001/0010276 A1 | 8/2001 | Calamari et al. | |
| 2003/0028310 A1 | 2/2003 | Schmitz et al. | |

* cited by examiner

*Primary Examiner*—Christopher Bottorff

(57) ABSTRACT

A method and apparatus of a work machine wherein an operator traverses the work machine within an operator selected speed range. The operator positions a speed-range control device to select the operator selected speed range, thus, sending a speed-range signal from the speed-range control device to an electronic control module indicative of the position of the speed-range control device. The speed-range signal is converted to a scaling factor to re-calibrate at least one drive map indicative of the scaling factor. The operator then may position a control device to traverse the work machine within the operator selected speed range.

12 Claims, 3 Drawing Sheets

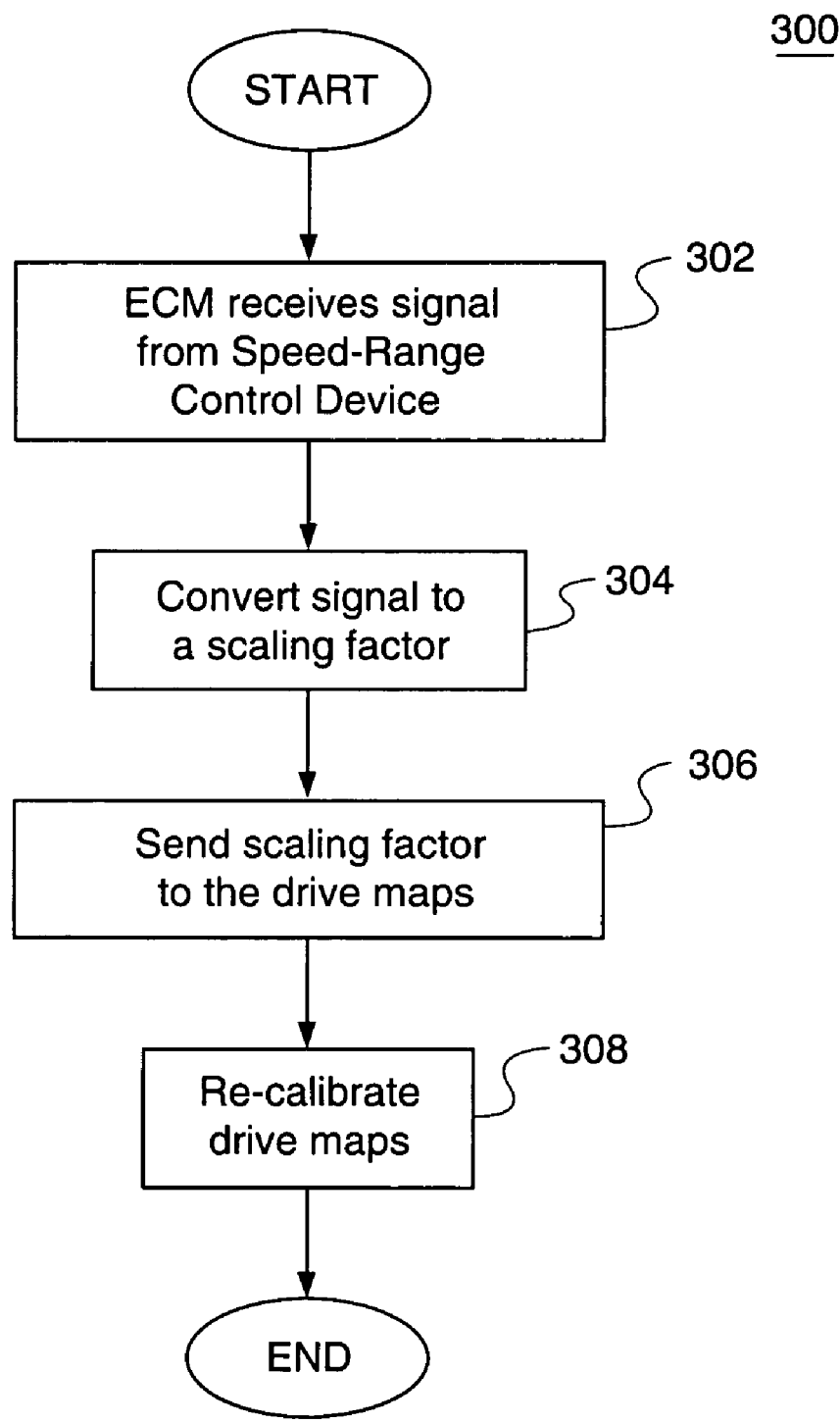

METHOD AND APPARATUS FOR CONTROLLING THE SPEED RANGES OF A MACHINE

TECHNICAL FIELD

This invention relates generally to controlling a speed range of a work machine, and, more particularly, to a method and apparatus for an operator of the work machine to select a desired speed range of the work machine.

BACKGROUND

Work machines, such as skid steer loaders, multi-terrain loaders, excavators, and the like, typically utilize an engine to drive a hydrostatic transmission. The work machine is normally controlled through at least one control member such as joysticks and/or foot pedals. This typically includes controlling the speed and direction of movement of the work machine.

It may be the desire of an operator to change the speed range of a work machine to perform a particular operation. For example, during a finish grading operation it may be desired to operate the work machine at a substantially constant low-speed to maintain a desired surface. To accomplish this the operator would typically try to hold the control member at a position to maintain the desired lower speed. This method becomes difficult to maintain the constant speed because of movement in the joystick causes the speeds of the work machine to fluctuate. The greater the speed range of the machine the greater the speed fluctuations are for joystick movement. On the other hand, if the speed range of the work machine is reduced, the less speed fluctuations there are for joystick movements and the easier it is to maintain a substantially constant speed. Therefore, by reducing the speed range of the work machine an operator can maintain a substantially constant low-speed.

One known apparatus for an operator selected maximum speed and recalibrated pedal range for a vehicle is described in U.S. Pat. No. 6,581,710 issued to Sprinkle et. al. on Jun. 24, 2003. It discloses a method and apparatus that utilizes a user-operated speed actuator, a microcontroller, and a user-operated speed set activator in conjunction with a ground speed sensor to set the maximum speed. Wherein the user-operated speed actuator moves over a limited range between a start end and a terminal end stop. The method includes the steps of: during running out of the vehicle, selecting an instantaneous ground speed, setting the new maximum vehicle ground speed at the instantaneous ground speed, and re-calibrate the actuator range from the minimum speed to the new maximum speed, the new maximum speed corresponding to the terminal end stop.

The present disclosure is directed to overcoming one or more of the problems as set forth above.

SUMMARY OF THE INVENTION

According to one exemplary aspect of the present invention a method of controlling a work machine to traverse within an operator selected speed range is disclosed. The method includes positioning a speed-range control device to select the operator selected speed range and sending a speed-range signal from the speed-range control device to an electronic control module indicative of the position of the speed-range control device. The speed-range signal is converted to a scaling factor to re-calibrate at least one drive map indicative of the scaling factor to change from a first speed range to second speed range, with the second speed range being indicative of the operator selected speed range, and positioning a control device to traverse the work machine within the second speed range.

According to another exemplary aspect of the present invention a method of controlling the speed ranges of a work machine is disclosed. The method includes sending a speed-range signal to a electronic control module indicative of the position of a speed control device, converting the speed-range signal to a scaling factor, and re-calibrating at least one drive map indicative of the scaling factor.

According to yet another exemplary aspect of the present invention an apparatus for controlling the speed range of a work machine is disclosed. The apparatus includes a hydrostatic transmission system and an electronic control module connected to the hydrostatic transmission system, the electronic control module having drive maps. The apparatus further includes at least one control device connected to the electronic control module, the control device sending a drive signal to the electronic control module indicative of the position of the control device, and a speed-range control device connected to the electronic control module, the speed-range control device sending a speed-range signal to the electronic control module indicative of the position of the speed control device. The electronic control module includes a speed control process to retaliate the drive maps indicative of the position of the speed-range control device.

BRIEF DESCRIPTION OF THE DRAWINGS

FIG. 3 is a flowchart of the present invention speed control process.

DETAILED DESCRIPTION

Figure 1:
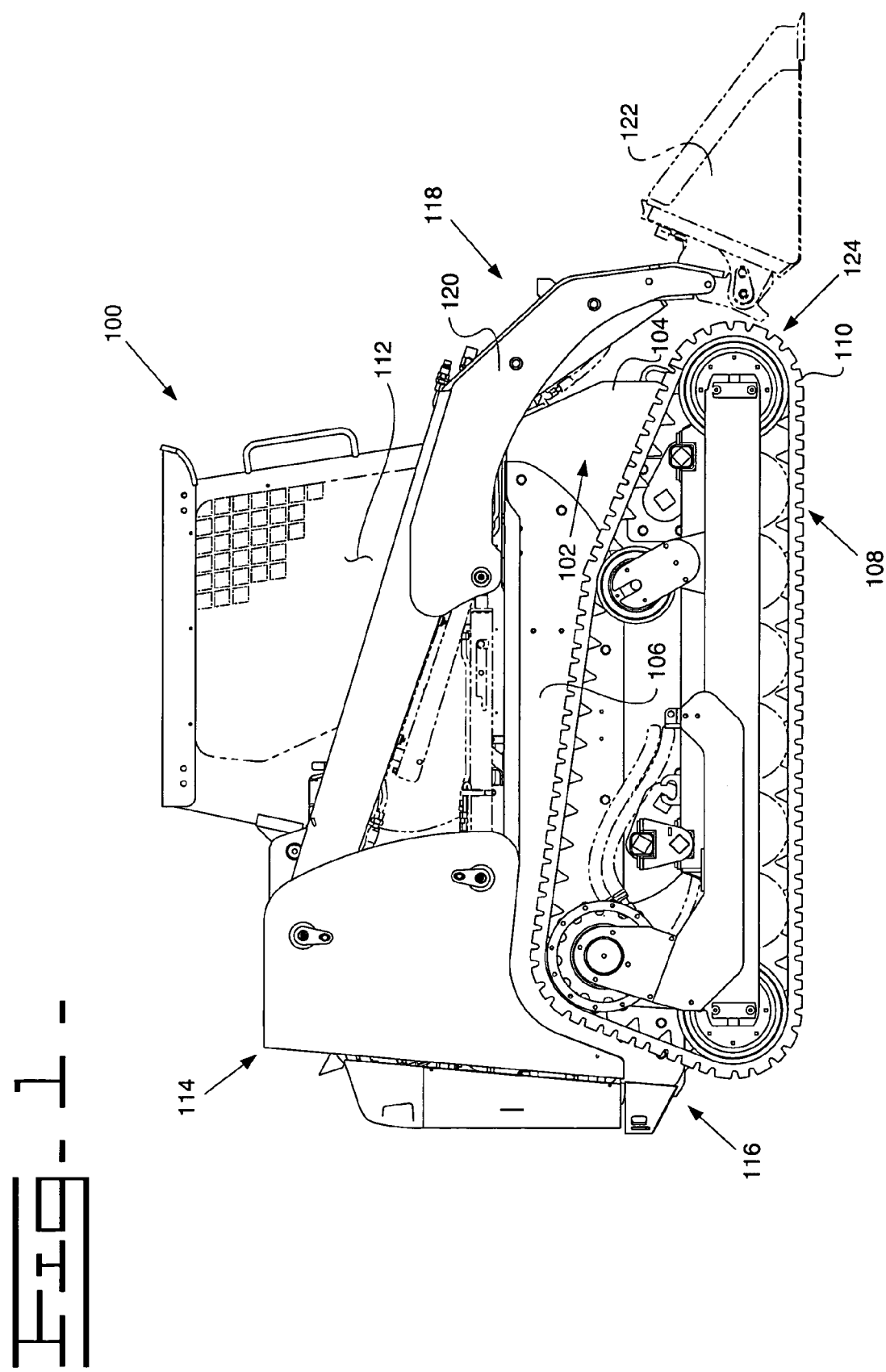
FIG. 1 is a perspective view of a work machine incorporating the present invention speed control process.

Referring to the drawings, a method and apparatus for controlling the speed range of a work machine 100 is shown. With particular reference to FIG. 1, the work machine 100 is depicted as a tracked skid steer loader and incorporates the features of a hydrostatic transmission system 200 therein (seen in FIG. 2). It should be understood, however, that the work machine 100 is meant to represent a wide variety of work machines, including, without limitation, a wheeled skid steer loader, a excavator, a tractor, or the like. The work machine 100, as shown, has a main frame assembly 102 having a lower frame 104 and an upper frame 106 mounted together to define the main frame assembly 102. An undercarriage 108 is connected to the main frame assembly 102 that includes right and left track assemblies 110, one of which is shown at 110. The work machine includes an operator's compartment 112 supported on the main frame assembly 102. Further, the main frame assembly 102 includes a pair of laterally spaced side members 114 located at a rear-end 116 of the main frame assembly 102. A pair of lift arms 118, of which one is shown at 120, is pivotally connected to the laterally spaced side members 114. An implement 122 is pivotally connectable with the lift arms 118 adjacent a front-end 124 of the main frame assembly 102. It should be understood, however, that the implement 102 could be any sort of implement, not just the bucket shown in FIG. 1, and may be mounted with only a single arm, boom and stick, or other implement mounting combinations.

The work machine 100 has connected thereto a controller, such as an electronic control module 202 (seen in FIG. 2), the electronic control module 202 is operably connected to the hydrostatic transmission system 200. The hydrostatic transmission system 200 is configured so as to operate the work machine's right and left track assemblies 110 in forward and reverse directions, steering the work machine 100, and controlling the speed of the work machine's travel.

The electronic control module 202 may include one or more control systems to control the work machine 100 and operate the implement 102. The electronic control module 202 includes a microprocessor (not shown), which is meant to include microcomputers, microprocessors, integrated circuits and the like cable of being programmed. The electronic control module 202 has drive maps for the left and right track assemblies 110 of the undercarriage 108. The drive maps have programmed within a predetermined speed range of the work machine 100. The speed range being from substantially zero to a predetermined maximum speed of the work machine 100. Authorized personnel may change the predetermined speed range by a means of programming the electronic control module 202, such as a direct link to the electronic control module 202, satellites, local area networks (LAN), wide area networks (WAN), personal data assistants (PDAs), laptops, or other means for programming the electronic control module 202. By changing the predetermined speed range of the work machine 100 the speed range is changed to reflect a range from substantially zero to the new predetermined maximum speed of the work machine 100.

Figure 2:
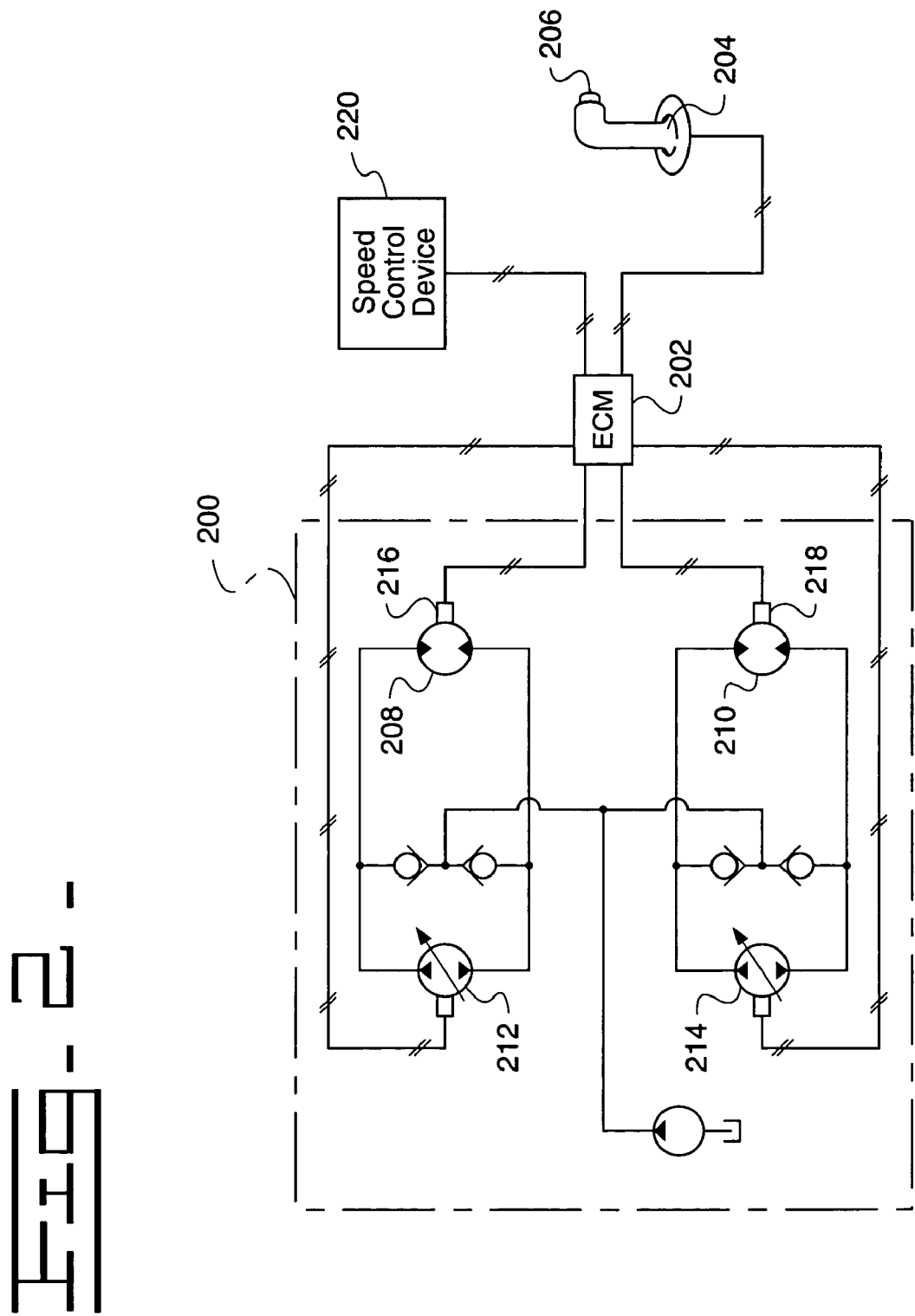
FIG. 2 is a diagrammatic view of a hydrostatic transmission system machine incorporating the present invention speed control process.

Referring to FIG. 2, the hydrostatic transmission system 200 is disclosed in more detail. It should be understood that FIG. 2 represents only a partial hydrostatic transmission system 200 and is an exemplary depiction of a typical closed loop hydrostatic transmission system 200. Alternatively, any hydrostatic transmission system may benefit from the features of the present invention.

A control device 204, such as a joystick, is located in the operator's compartment 112 and is connected to the electronic control module 202. The control device 204 is used to control the travel of the work machine 100 via the undercarriage assembly 108 in a well known manner. The control device 204, controlled by an operator (not shown), is movable to a plurality of positions to move the work machine 100 in forward or reverse directions in combination with steering capabilities to the left or right. The control device 204 is capable of sending a drive signal to the drive maps within the electronic control module 202 indicative of the position of the control device 204. The drive maps converts the drive signal to an electronic control module output signal indicative of the direction and speed of the work machine. The electronic control module output signal is sent to the hydraulic transmission system 200 for the controlling the right and left track assemblies 100 of the undercarriage 108. Although one control device 204 is shown, it should be understood that a plurality of control devices may be operable to control the travel of the work machine 100.

A pair of motors 208, 210, as shown, is used to achieve forward or reverses drive conditions of the work machine 100, however, it should be understood that any number of motors may be used to traverse the work machine 100. The motors 208, 210 may be two speed motors capable of achieving high or low speed ranges of the work machine 100. The motors 208, 210 are spaced apart and operably connected to the right and left track assemblies 110 of the undercarriage assembly 108. The motors 208, 210 may include a pair of speed sensors 216, 218 operatively connected to their respective motor 208, 210. The speed sensors 216, 218 are connected to the electronic control module 202 and are capable of sending a feedback signal to the electronic control module 202 indicative of the ground speed of the work machine 100.

The control device 204 may include a two-speed switch 206 thereon, which is operable by the operator (not shown) to control the speed of the motors 208, 210 in either one of high and low speed. By selecting either the high or low speed on the control device 204 a signal is sent to the electronic control module 202 to change the motors 208, 210 to high or low speed ranges, respectively.

A pair of pumps 212, 214, as shown, is connected with a respective motor 208, 210, however, it should be understood that any number of pumps may be used with the present invention. The pumps 212, 214 operate in a well known manner to pressurize hydraulic fluid within the hydrostatic transmission system 200 to drive the motors 208, 210. The pumps 212, 214 are shown as variable displacement electronically controlled pumps connected to the electronic control module 202. In the exemplary hydrostatic transmission system 200 the electronic control module 202 controls the output flow and the flow direction of the pumps 212, 214.

An operator selectable speed-range control device 220 is connected to the electronic control module 202 wherein a speed control process 300 (seen in FIG. 3) is used to change the speed ranges of the drive maps programmed in the electronic control module 202. The speed-range control device 220 is located in the operator's compartment 112 (seen in FIG. 1) and capable of sending a speed-range signal to the electronic control module 202 indicative of an operator selected speed range of the work machine 100. The speed-range control device 220 may be a finite multi-positional switch, such as a toggle, push button, display screen, or the like, wherein the operator selects from a plurality of predetermined speed ranges, or may be a infinite variable selector, such as a dial, lever, or the like, wherein the operator selects the speed range by positioning the selector between a start and end position of the selector.

The operator's compartment 112 (seen in FIG. 1) may be equipped with a speed-range control "ON/OFF" switch 222 connected to the electronic control module 202. The speed-range control "ON/OFF" switch 222 may be a push button, toggle, key, display screen, or the like to operatively send a signal to the electronic control module 202 indicative of a "ON" or "OFF" position. Although the speed-range control "ON/OFF" switch 222 is shown separately from the speed-range control device 220, the speed-range control "ON/OFF" switch 222 and the speed-range control device 220 may be one device.

FIG. 3 further shows the speed control process 300 using the speed-range control "ON/OFF" switch 222 in greater detail. Control starts at decision block 301, wherein it is determined if the speed-range control "ON/OFF" switch 222 is in the "ON" position. If yes, control passes to block 302, wherein the speed-range signal from the speed-range control device 220 is received indicative of the desired max speed range of the work machine 100. If the speed-range control "ON/OFF" switch 222 is in the "OFF" position, the speed control process starts over.

Next, control passes to block 304, wherein the speed-range signal is converted to a scaling factor. For example, in an exemplary situation using a multi-positional switch of 3 positions. When the switch is in the first position, the speed-range signal is sent to the electronic control module 202 and is converted to a scaling factor of 1. By switching the switch to the second position, the speed-range signal is sent to the electronic control module 202 and is converted to a scaling factor of 0.66. Furthermore, if the switch is in the third position, the speed-range signal is sent to the electronic control module 202 and converted to a scaling factor of 0.33.

If the work machine is not equipped with the speed-range control "ON/OFF" switch 222, then control starts with block 304.

Control then passes the block 306, wherein the scaling factor is sent to the drive maps. Next, control passes to block 308, wherein the scaling factor re-calibrates the drive maps indicative of the operator selected speed range of the work machine 100 and changes from a first speed range to a second speed range. The first speed range being indicative of the predetermined speed range or a previous operator selected speed range, and the second speed range being indicative of a present operator selected speed range. For example, if the switch is in the second position and the scaling factor is 0.66, the drive maps are re-calibrate to have a range from substantially zero to 66% of the predetermined max speed of the work machine 100.

INDUSTRIAL APPLICABILITY

During operation of the work machine 100, the operator (not shown) has the option of controlling the speed ranges of the work machine 100 through the operator selectable speed-range control device 220 located in the operator's compartment 112. It may be desirable to select a speed range that is less than the predetermined speed range when performing various machine operations, such as fine grading, trenching, or planning road surfaces, and still utilize the full range of the control device 204.

When an operator operates the work machine 100, the operator positions the control device 204 to control the work machine's 100 speed and direction. The control device 204 sends a drive signal to the electronic control module 202 indicative of the position of the control device 204. The drive signal is then looked up on drive maps that correspond the drive signal to the speed and direction of the work machine 100, wherein the drive maps have speed ranges up to the predetermined maximum speed of the work machine 100. The electronic control module 202 sends the electronic control module output signal to the hydrostatic transmission system 200 to control the left and right track assemblies 110 of the undercarriage 108. Any fluctuations in the control device 220 have a proportional speed fluctuation.

In the exemplary closed loop hydrostatic transmission system 200 the drive signal commanded by the operator and the feedback signal indicative of the actual ground speed provided by the speed sensors 216,218 are passed into the electronic control module 202. The electronic control module compares the feedback signal to the drive signal and produces an error signal based on discrepancies between the commanded speed and the actual speed of the work machine 100. The electronic control module 202 provides the electronic control module output signal to the hydrostatic transmission system 200 indicative of the error signal.

When the operator desires to operate of the work machine 100 at a constant low-speed or to work within a low-speed range, a speed-range control device 220 is utilized. If the work machine 100 is equipped with a speed-range control "ON/OFF" switch 222, the operator positions the speed-range control "ON/OFF" switch 222 to the "ON" position. Then the operator positions the speed-range control device 220 to send a speed-range signal to the electronic control module 202 indicative of the operator selected speed range of the work machine 100 to change the speed range from a first speed range to a second speed range. A speed control process 300 within the electronic control module 202 receives the speed-range signal and converts the speed-range signal to a scaling factor. The scaling factor is applied to the drive maps, wherein the speed ranges of the drive maps are re-calibrated from the first speed range to the second speed range. For example, the operator desires a speed range that goes up to 66% of the predetermined max speed of the work machine 100. The operator selects the second position on the speed control device 220. A speed-range signal is sent to the electronic control module 202, and more particularly to the speed control process 300, wherein the speed-range signal is converted to a scaling factor. The scaling factor is applied to the drive maps, wherein the drive map ranges are re-calibrated to 66% of the predetermined max speed of the work machine 100.

After re-calibration of the drive maps, when the operator positions the control device 204 to maintain a substantially constant low-speed, the work machine operates within the 66% of the predetermined speed range of the work machine 100, and any fluctuations in the control device 220 have a lesser impact on speed fluctuations. In addition, because of the availability a plurality of speed ranges, the operator has greater flexibility in working within a desired speed range and maintain the full range of movement of the control device 204.

Other aspects of the present invention may be obtained from study of the drawings, the disclosure, and the appended claims. It is intended that the specification and examples be considered exemplary only.

What is claimed is:

1. A method of controlling a machine to traverse within an operator selected speed range and direction, the machine having a first control device and a transmission, comprising:
   receiving an operator selected speed-range signal from a second control device;
   converting the speed-range signal to a scaling factor;
   re-calibrating at least one drive map according to the scaling factor to change from a first speed range to a second speed range, the second speed range being indicative of the operator selected speed range;
   receiving a drive signal from the first control device indicative of a desired speed and direction;
   determining an output signal as a function of the drive signal and the at least one drive map; and
   delivering the output signal to the transmission.

2. The method of claim 1, further comprising:
   controlling the machine speed through feedback from at least one speed sensor.

3. The method of claim 1, wherein re-calibrating the at least one drive map includes controlling the predetermined maximum speed of the machine.

4. The method of claim 1, including:
   positioning a speed-range control "ON/OFF" switch to the "ON" position.

5. The method of claim 1, wherein re-calibrating the at least one drive map includes controlling the predetermined maximum speed of the machine.

6. The method of claim 1, wherein the transmission has at least one pump and at least one motor operatively connected to the at least one pump, and including:
   providing at least one speed sensor connected to the at least one motor; and
   controlling the machine speed through feedback from the at least one speed sensor.

7. The method of claim 1, wherein the second control device is one of a multi-positional switch and an infinite variable selector.

8. The method of claim 6, wherein the at least one pump is a variable displacement pump.

9. The method of claim 6, wherein the transmission is a closed loop hydrostatic transmission system.

10. The method of claim 1, wherein the transmission includes a first and a second motor, and wherein the output signal includes a first and a second motor speed and a first and a second motor direction.

11. The method of claim 10, wherein the machine includes a first track driven by the first motor and a second track driven by the second motor.

12. The method of claim 1, wherein the machine is a skid steer loader.

* * * * *

UNITED STATES PATENT AND TRADEMARK OFFICE
CERTIFICATE OF CORRECTION

PATENT NO. : 7,287,620 B2  Page 1 of 1
APPLICATION NO. : 10/889685
DATED : October 30, 2007
INVENTOR(S) : Thomas et al.

It is certified that error appears in the above-identified patent and that said Letters Patent is hereby corrected as shown below:

On the Title page item (75), under "Inventors", in Column 1, Line 2, delete "Raleigh" and insert -- Apex --, therefor.

Column 1, Line 50, delete "re-calibrate" and insert -- recalibrating --, therefor.

Column 2, Line 26, delete "retaliate" and insert -- recalibrate --, therefor.

Signed and Sealed this

Fifteenth Day of July, 2008

JON W. DUDAS
*Director of the United States Patent and Trademark Office*